United States Patent
Le Chevalier et al.

(10) Patent No.: US 11,037,554 B1
(45) Date of Patent: Jun. 15, 2021

(54) NETWORK OF DOMAIN KNOWLEDGE BASED CONVERSATIONAL AGENTS

(71) Applicant: Wells Fargo Bank, N.A., San Francisco, CA (US)

(72) Inventors: Vincent Le Chevalier, San Jose, CA (US); Ramanathan Ramanathan, Bellevue, WA (US); Abhijit Rao, Irvine, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 31 days.

(21) Appl. No.: 15/730,217

(22) Filed: Oct. 11, 2017

Related U.S. Application Data (60) Provisional application No. 62/557,431, filed on Sep. 12, 2017.

(51) Int. Cl.
| | |
|---|---|
| *G10L 15/22* | (2006.01) |
| *H04L 12/58* | (2006.01) |
| *G10L 15/16* | (2006.01) |
| *G10L 15/18* | (2013.01) |

(52) U.S. Cl.
CPC ............. *G10L 15/22* (2013.01); *G10L 15/16* (2013.01); *G10L 15/1815* (2013.01); *H04L 51/02* (2013.01)

(58) Field of Classification Search
CPC . G06F 17/2881; G10L 13/08; G10L 15/1815; G10L 15/22; G10L 2015/223; G10L 15/16; H04L 51/02
See application file for complete search history.

(56) References Cited

U.S. PATENT DOCUMENTS

| | | | |
|---|---|---|---|
| 9,244,894 B1* | 1/2016 | Dale .................... | G06F 17/2235 |
| 9,812,151 B1* | 11/2017 | Amini .................... | G10L 15/265 |
| 9,866,693 B2* | 1/2018 | Tamblyn ............. | H04M 3/5191 |
| 10,013,983 B1* | 7/2018 | Johnson ............ | H04W 12/0602 |
| 2003/0126136 A1* | 7/2003 | Omoigui ................ | H04L 29/06 |
| 2004/0243393 A1* | 12/2004 | Wang ..................... | G10L 15/22 |
| | | | 704/9 |
| 2006/0026300 A1* | 2/2006 | Rose .................... | H04L 67/2823 |
| | | | 709/246 |
| 2007/0198272 A1* | 8/2007 | Horioka .................. | G10L 15/22 |
| | | | 704/275 |
| 2009/0204391 A1* | 8/2009 | Okada ................. | G06F 16/3329 |
| | | | 704/9 |

(Continued)

*Primary Examiner* — Angela A Armstrong
(74) *Attorney, Agent, or Firm* — Walter Haverfield LLP; James J. Pingor (57) ABSTRACT

The innovation disclosed and claimed herein, in one aspect thereof, comprises systems and methods of supporting a conversation with a user. The systems and methods of the innovation can include a bot consumer that receives a first dialogue input from a user, the first dialogue input requesting a response and having an intent. A super-agent selects a worker thread from a pool of worker threads, wherein the worker thread is delegated a task to perform on the first dialogue input. A registrar determines a conversational agent to respond to the user based on the intent. The conversational agent retrieves data to facilitate a response to the first dialogue input and renders a response to the user based on the retrieved data. A registrar custodian can perform create, read, update, and delete operations on the information in the registrar.

7 Claims, 6 Drawing Sheets

(56) References Cited

U.S. PATENT DOCUMENTS

| | | | | |
|---|---|---|---|---|
| 2012/0036121 A1* | 2/2012 | Jitkoff | G06F 3/16 | |
| | | | 707/722 | |
| 2014/0270145 A1* | 9/2014 | Erhart | H04M 3/523 | |
| | | | 379/265.13 | |
| 2016/0295018 A1* | 10/2016 | Loftus | H04M 3/5175 | |
| 2017/0109390 A1* | 4/2017 | Bradley | G06F 16/335 | |
| 2018/0090141 A1* | 3/2018 | Periorellis | G10L 15/22 | |
| 2018/0181558 A1* | 6/2018 | Emery | G06F 17/279 | |
| 2018/0232563 A1* | 8/2018 | Albadawi | A61B 5/1113 | |
| 2018/0307687 A1* | 10/2018 | Natkin | G06F 17/3053 | |
| 2019/0005089 A1* | 1/2019 | Kempf | G06F 17/30554 | |
| 2019/0266280 A1* | 8/2019 | Acampado | G06F 9/455 | |

\* cited by examiner

NETWORK OF DOMAIN KNOWLEDGE BASED CONVERSATIONAL AGENTS

CROSS-REFERENCE TO RELATED APPLICATIONS

This application claims the benefit of U.S. Provisional Patent Application Ser. No. 62/557,431 entitled "NETWORK OF DOMAIN KNOWLEDGE BASED CONVERSATIONAL AGENTS" filed on Sep. 12, 2017. The entirety of the above-noted application is incorporated by reference herein.

BACKGROUND

Recent developments in technology have led to the emergence of new class of applications that are automating conversations with users. The new class of applications is trained to understand the domain knowledge and provide answers. The training is important because the underlying knowledge might be improving, there can be changes to regulations, policies, new products, new services, and/or new channels are being devised for this new class of applications. Oftentimes the training is inadequate and the new class of applications does not provide the best user experience. The training becomes constant and burdensome which increases system downtimes.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods for supporting a conversation with a user. A method includes receiving a first dialogue input from a user that requests a response. The method includes processing the dialogue input to determine semantics and intent to select a worker thread and a conversational agent to respond to the user. The method includes retrieving data to facilitate a response to the first dialogue input; and rendering a response to the user based on the retrieved data.

A system of the innovation can include a bot consumer that receives a first dialogue input from a user, the first dialogue input requesting a response and having an intent. A super-agent that selects a worker thread from a pool of worker threads, wherein the worker thread is delegated a task to perform on the first dialogue input. A registrar that determines a conversational agent to respond to the user based on the intent. The conversational agent retrieves data to facilitate a response to the first dialogue input and renders a response to the user based on the retrieved data.

In another aspect of the innovation, a system can include a registrar that stores information about a group of conversational agents. The system includes a conversational agent having a state and attributes, wherein the conversational agent is registered with the registrar and wherein the information stored by the registrar are one or more attributes and the state is dormant. The system includes a registrar-custodian can perform create, read, update, and delete operations on the entries in the registrar.

In aspects, the subject innovation provides substantial benefits in terms of automated conversations with customers or users. One advantage resides in a distributed system that allows conversational agents to be added, updated, removed as domain knowledge changes without taking down the entire system. Another advantage resides in better customer training when a customer desires more information about a subject.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 1:
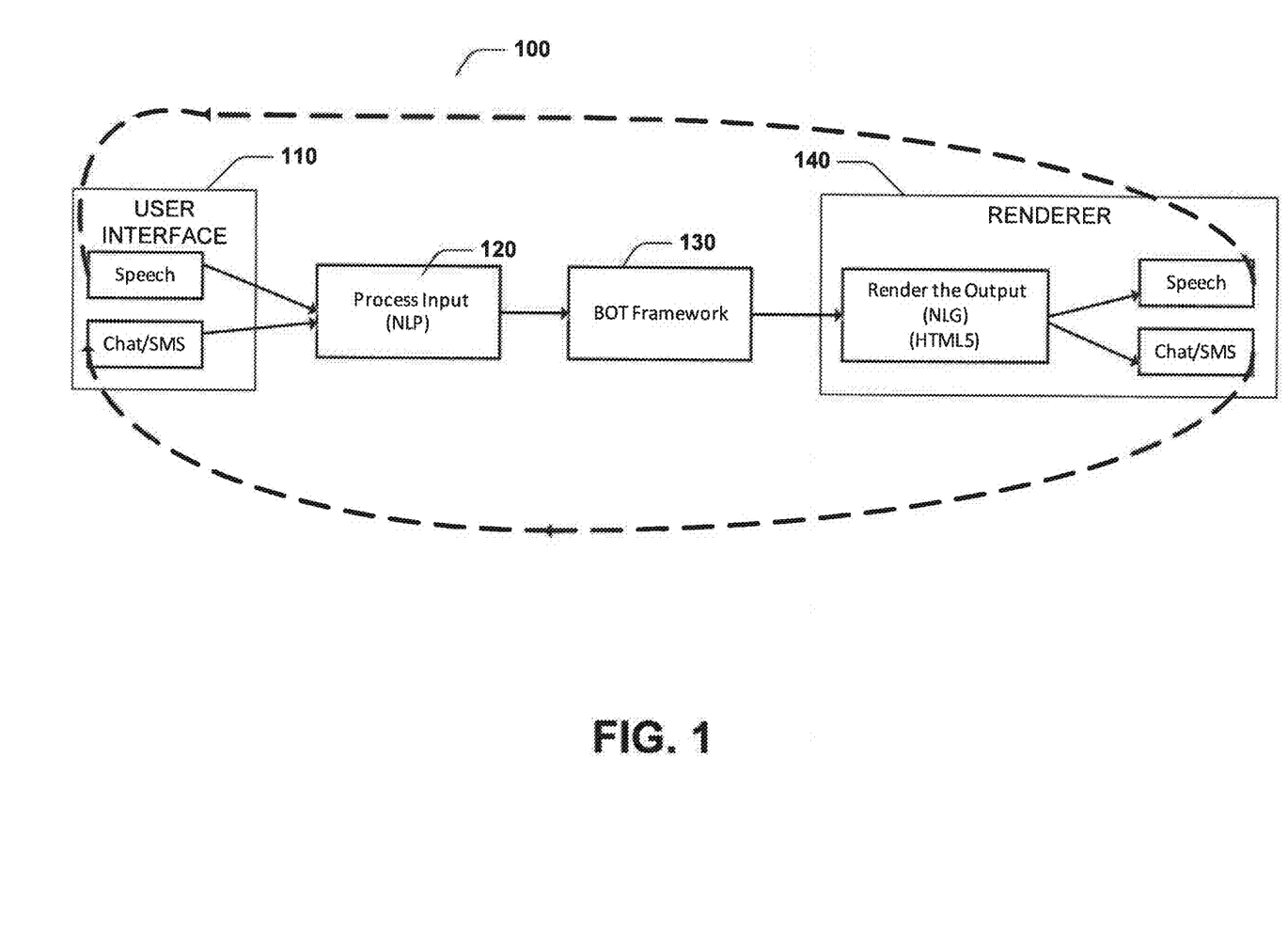
FIG. 1 illustrates an example component diagram of a system of the present innovation.

FIG. 1 illustrates a system 100 for supporting conversations with a user. The system 100 includes a user interface 110. The user interface 110 can receive inputs from a user such as dialogue input, prompt, question, topic, and/or the like. In some embodiments, the user interface 110 receives a speech, voice, input from a user. In other embodiments, the user interface 110 receives a text input such as a chat, a SMS, MMS, and/or the like. The user interface 110 can be a computer, mobile device, tablet, touchscreen, and/or the like. In some embodiments, the user interface 110 can receive a combination of those afore mentioned inputs.

The system 100 includes a natural language processor NLP 120. The NLP 120 receives a dialogue input from the user interface 110. The NLP 120 can process the dialogue input such that it recognizes the substance of the dialogue input. In some embodiments, the NLP 120 can recognize keywords to determine the intent, context, and/or topic of the dialogue input. The intent indicates mapping between dialogue input and the action to be taken. For example, a dialogue input may be "I want to transfer money to my brother." The NLP 120 can recognize the topic, i.e. domain knowledge, as money transfers and the intent as starting an automated dialogue with the system 100 to receive more information about the transfer.

The NLP 120 provides a bot framework 130 with the topic/domain and intent such that an answer or dialogue output can be generated for the dialogue input. The bot framework 130 determines dialogue outputs to respond to the user and the dialogue input provided by the user to further a conversation that will complete the user's desired task or provide requested information, e.g. a money transfer. The bot framework 130 predicts and learns the user preferences and "next best" suggestions to facilitate the outputs to the user. The bot framework 130 is described in detail below.

The system 100 includes an output renderer 140. The output renderer 140 receives the determined output from the bot framework 130. The output renderer 140 determines the mode of output. For example, the output renderer 140 determines whether the output is rendered as speech (or voice), text (chat, SMS, or the like), and/or media (video, slideshow, chart, graph, and/or the like). In some embodiments, the output renderer 140 pushes the rendered output to the user interface 110. In some embodiments, the user interface 110 receives the rendered output and then a subsequent dialogue input from the user to be processed and a subsequent dialogue output rendered. The dialogue input and dialogue output can form a input/output repeatable loop until the conversation reaches an end. In the above example, the dialogue input and output loop will end upon completion of the money transfer. In some embodiments, the system 100 is connected or a part of a financial network that can provided transactional details to the financial network to complete financial transactions.

Figure 2:
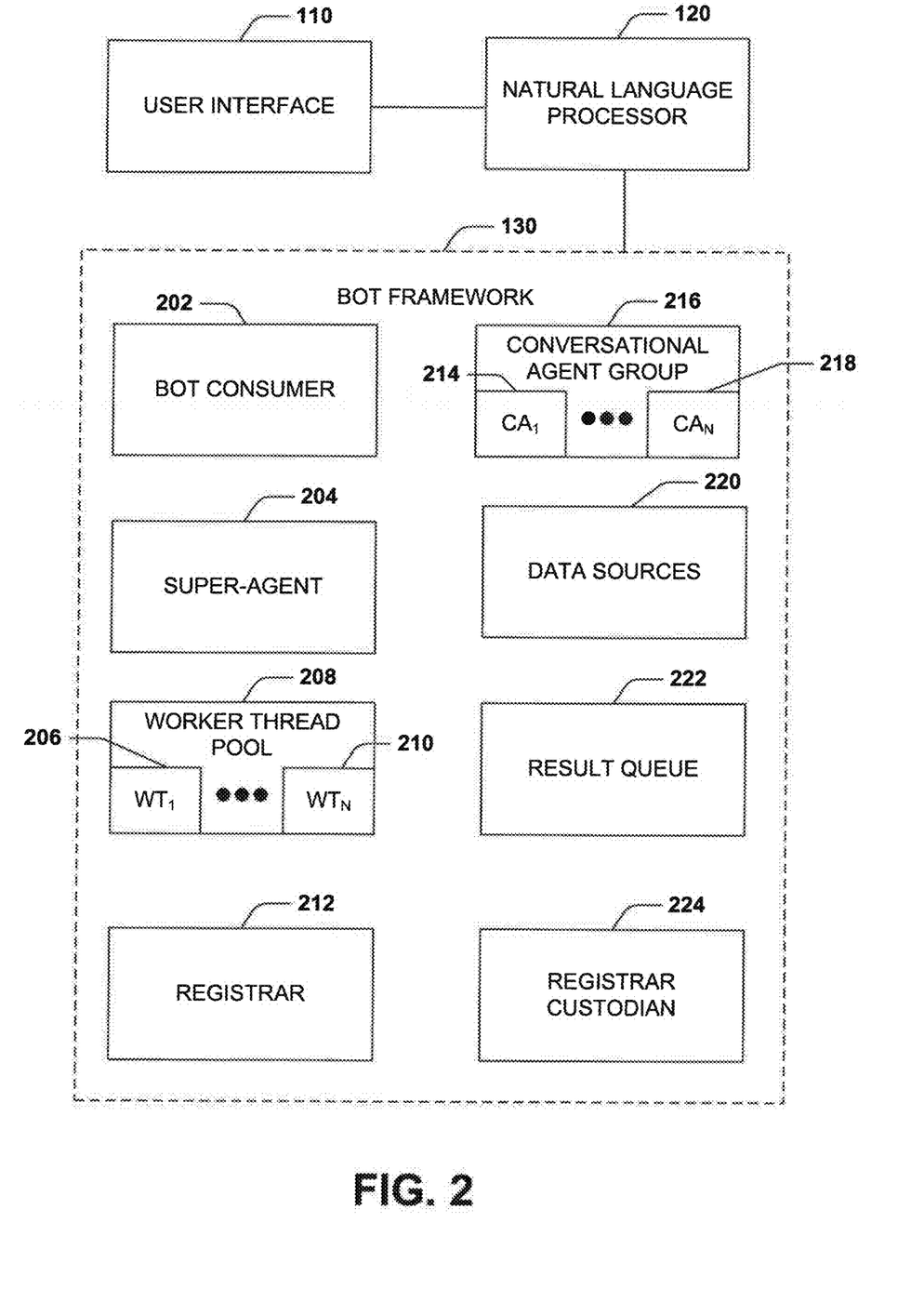
FIG. 2 illustrates an example component diagram of a bot framework.

FIG. 2 illustrates a detailed component diagram of the bot framework 130. As discussed above, a user interface 110 can receive inputs from a user such as dialogue input, prompt, question, topic, and/or the like. In some embodiments, the user interface 110 receives a speech/voice input from a user. In other embodiments, the user interface 110 receives a text input such as a chat, a SMS, MMS, and/or the like.

The system 100 includes a natural language processor NLP 120. The NLP 120 receives the dialogue input from the user interface 110. The NLP 120 can process the dialogue input such that it recognizes the substance of the dialogue input. In some embodiments, the NLP 120 can recognize keywords to determine the topic of the dialogue input. In other embodiments, the NLP 120 can recognize intent of the dialogue input. Intent indicates mapping between dialogue input and the action to be taken. For example, a dialogue input may be "I want to transfer money to my brother." The NLP 120 can recognize the topic as money transfers and the intent as starting an automated dialogue with the system 100 to receive more information about the transfer.

The NLP 120 provides the bot framework 130 with the topic and intent such that an answer or dialogue output can be generated to the dialogue input. The bot framework 130 includes a bot consumer 202 that is an entry point to the bot framework 130. The bot consumer 202 receives a copy of the dialogue input and the determined intents indicating mapping between dialogue input and the action to be taken. In some embodiments, the bot consumer 202 can send a dialogue output to the user interface 110.

The bot consumer 202 provides the received dialogue input and intents to a super-agent 204. The super-agent 204 manages the bot framework 130 resources to efficiently assign tasks and/or manage generation of dialogue outputs. The super-agent 204 can assign a worker thread 206 to the dialogue input. The worker thread 206 is a unit of execution assigned to perform a single task, e.g. obtaining a dialogue output or resolution to the dialogue input. In some embodiments, the worker thread 206 belongs to a pool of worker threads 208 such that the super-agent selects a worker thread 206 from the pool of worker threads 208. The pool of worker threads 208 can have worker threads from $WT_1$ 206 to $WT_N$ 210.

The worker thread 206 works with a registrar 212 to select a conversational agent 214. The conversational agent 214 is registered with the registrar 212, where the registrar 212 stores information about a group of conversational agents 216 that has conversational agents from $CA_1$ 214 to $CA_N$ 218. The information can be intents, availability (or state), topic, and/or the like. The registrar 212 receives the intents and selects a conversational agent 214 with the correct associated intent to determine a dialogue output.

Once the conversational agent 214 is selected, the worker thread 206 is provided the conversational agent 214 to be executed and thus facilitate generation of a dialogue output.

In some embodiments, the conversational agent 214 generates result data, i.e. a dialogue output, by contacting data sources 220. The data sources 220 can include relevant databases, internet sources, financial networks, and/or the like.

In some embodiments, the conversational agent 214 can seamlessly switch to a super agent, e.g. a human agent for generation of a dialogue output. In other embodiments, the conversational agent 214 can determine a decision is needed from a super agent. The decision may be specific information and/or approval of a user request contained within the dialogue input. In this embodiment, the conversational agent 214 can provide the super agent with a template dialogue output having a form response with missing parts to be provided by the super agent. For example, the decision to approve a credit card can be determined by a super agent. The conversational agent 214 can provide a partial response to the super agent such as "You have been _______ for _______ amount of credit." In this example, the super agent determines a decision for approve/deny and an amount of credit. The conversational agent 214 can receive the decision and complete the dialogue output. For example, the decision is approve and 1000 dollars. The conversational agent 214 renders a dialogue output of "You have been approved for $1000 amount of credit." to the user.

In some embodiments, the conversational agent 214 can identify media to be distributed to the user. For example, the media can be an informative video. In other embodiments, the conversational agent 214 can generate graph elements that can be composed and presented to the user in response to a dialogue input. For example, a user inputs "Show me changes to mortgage payment if I prepay." The conversational agent 214 can generate a graph for a different monthly payment schedule.

In some embodiments, the conversational agent 214 executes a semantic tree. The dialogue input can include a semantic tree as well along with a context object. The context object is information about the user and context to the ongoing conversation between the user and the system 100 where the conversation is a sequence of dialogue inputs and outputs. The semantic tree can facilitate the selection of a conversational agent 214 from the conversational agent group 216. The conversational agent 214 executes the semantic tree on the dialogue input to facilitate retrieving information the data sources and/or media. The conversation agent 214 generates a results set.

The conversational agent 214 returns the results set to a results queue 222. The results set can be data obtained from the data sources, identified media, and/or context. In some embodiments, the results queue 222 contains multiple results sets from multiple conversational agents 218 that were tasked by the first worker thread 206.

In some embodiments, the super-agent 204 identifies a second worker thread 210 to process and compile the results sets in the result queue 222. The second worker thread 210 processes the results sets into a dialogue output that is rendered to the user at the user interface 110 by the renderer 140 (not shown in FIG. 2). In some embodiments, the conversational agent compiles and renders the dialogue output to the user interface.

In some embodiments, multiple conversational agents 218 based on the dialogue input and the different semantics contained within the dialogue input may be employed. In some embodiments, the conversational agents 218 are chained in an ordered sequence. For example, semantics in the dialogue input can determine the use of a greetings semantic conversational agent, after which an authentication semantic conversational agent is invoked to identify the user, followed by an offerings (or product) semantic conversational agent to present the banking products and services to the customer, a media packager, and/or the like. Conversational agents may launch or select subsequent conversational agents to transfer a conversation to an appropriate conversational agent. For example, the first worker thread may use the greetings semantic conversational agent to manage introductory conversations with the user over the user interface 110. After the greetings, the greetings semantic conversational agent can transfer the conversation to the authentication semantic conversational agent that authenticates the user using dialogue outputs and inputs to receive authentication information. In other embodiments, multiple conversational agents 218 may be invoked in parallel to process different parts of a dialogue input or multiple dialogue inputs from the same user.

If the authentication semantic conversational agent authenticates the user and the user inputs a dialogue input about wanting to know about the offerings, the authentication semantic conversational agent launches the offerings semantic conversational agent which knows about the offerings. A media packager may be launched to package media to be presented, e.g. an informative video, slideshow, or graph, to the customer and track the customer's interactivity with the media.

In some embodiments, the conversational agents can task other processes or parts of a financial institution, for example, to complete transactions. For example, if the authentication semantic conversational agent determines the user is valid and the user wants to pay a mortgage, the authentication semantic conversational agent can task a customer data access client to obtain financial data about the user and launches a mortgage semantic conversational agent. The mortgage conversational agent completes the mortgage payment as per the user's dialogue inputs.

The bot framework 130 can include a registrar custodian 224 that controls updating/addition/deletion of conversational agents to the available database of conversational agents at the registrar 212. The registrar custodian 224 can make changes to the database (or table) within the registrar 212 that compiles the list of conversational agents in the group of conversational agents 216. In some embodiments, the registrar custodian 224 performs create, read, update, delete (CRUD) operations on database entries of conversational agents in the registrar 212. The registrar custodian 224 can add code representing a first conversational agent to the group of conversational agents and register the first conversational agent details with the registrar 212. The registrar custodian 224 can delete code representing a second conversational agent from the group of conversational agents and deregister the second conversational agent details with the registrar 212.

The following are example conversations having dialogue inputs and outputs. It is appreciated that these conversations are for explanation purposes and that other conversations are contemplated. In the examples, Jdoe is the user inputting dialogue inputs and Ela is the conversational agent(s) dialogue outputs.

Conversation #1:
  Jdoe > when is my CD maturing? What options do I have then? I have an opportunity to invest in real estate.
  Ela> By May 8 the funds from the CD will be available. Before we get to your options, if the real estate fund has an annualized return of 5.25% over 5 years, you should look more into it right away.
  Jdoe> why 6% over 5 years?

Ela> Sure, it is based on how much you earn in CD and the penalty you get if you withdraw funds now.
Jdoe> OK
Ela> what is the real estate fund?
Jdoe> It is Pinkstone's PRIME 2-
Ela> when does your investment window close?
Jdoe> what?? Que??
Ela> el tiempo de inversion duración
Jdoe> 3 weeks
Ela> cambiar a español?
Jdoe> no
Ela>ok—PRIME2 ITD is 5.15% since 1999; Based on other factors I recommend PRIME2
Jdoe> what factors?
Ela> last 5 years it has been 5.6%—average maturity is 3.6 years. Recently they invested in Hilton Properties. You want to know more?
Jdoe> No
Ela> did you know PRIME2 is a REIT?
Jdoe> what is a REIT?
Ela> Want to watch 30 second video on REIT?
Jdoe> yes
*Ela shows video**
*Jdoe watches the video**
Jdoe> got it In Conversation #1, conversational agents are switched seamlessly depending on the dialogue inputs and ongoing conversation with the Jdoe. The conversational agent first employed can be an authentication conversational agent that implicitly authenticates Jdoe. Conversational agents can access Jdoe's financial information that is located on a financial network because Jdoe asked a question regarding his financial information. A language conversational agent detect change in language in the dialogue inputs and switch languages and request a confirmation of which language to proceed with in the ongoing conversation. Conversational agents can include domain knowledge expertise. In this example, knowledge of financial instruments. For example, a CD conversational agent can retrieve data about Jdoe's CD and compute different payments. A REIT conversational agent can retrieve information about a specific REIT to provide a dialogue output with the information as well as employ a media packager to present a customer training video on REITs as a dialogue output to the user. The conversational agent can compare the financial instruments and present dialogue outputs to Jdoe.

Conversation #2
Jdoe > Hi
Ela> Hello! How can I help you?
Jdoe> Can you help me pay mortgage?
Ela> Sure—tell me about yourself
*Jdoe clicks an image of his Credit Card**
Ela> got it—thank you Mr. Doe
Ela>last four of you social and your zipcode please
Jdoe>95014
Ela> OK
Jdoe> 1234
Ela>thank you—make the payment of 3723
Jdoe>yes
Ela>want to pay additional principal of 277—if you pay each month you payoff 3 year early
Jdoe> really—how does that work
Ela> yes—check this out
*Ela pushes an interactive graph to Jdoe**
*Jdoe plays with the graph**
Ela> based on your cash flow—277 to 477 is what I recommend
Jdoe> OK—let us go with 277
Ela> Should I set it up for every month?
Jdoe> yes—but remind me every month In Conversation #2, conversational agents are again switched seamlessly depending on the dialogue inputs and ongoing conversation from the Jdoe. The initial NLP shows a greeting and therefore a worker thread selects a greetings conversational agent for the first dialogue output. An authentication conversational agent explicitly authenticates Jdoe using a provided picture of his credit card and requesting/receiving a zip code and social security number associated with the card. A mortgage conversational agent having domain knowledge of mortgages and prepayment of mortgages is tasked with accessing the financial information of Jdoe and calculating the payments. A media packager can generate an interactive graph to display the mortgage payments to Jdoe. A scheduling conversational agent can query whether to set up a monthly reminder and execute the monthly reminder request on the financial network.

Conversation #3:
Jdoe>Hi, I want to transfer money to my brother in Chile
Ela>sure, Mr. Doe I can help you with that
Ela>what is the amount? Is it Mr. Alex Doe?
Jdoe> yes, 1300
Ela>ok—want to watch this 15 second video on your favorite topic "latest gadgets"
Jdoe> sure
*Ela prepares the Sender Receiver Information form, sends along with current KYC data to a Human Mr. Approver. Mr. Approver approves it.**
Ela>It is confirmed and will cost you $20. Please confirm
Jdoe>yes send it In Conversation #3, conversational agents and human agents are switched seamlessly depending on the dialogue inputs and the domain knowledge of the conversational agents. The conversational agents employed can be an authentication conversational agent that implicitly authenticates Jdoe. A transfer conversational agent can access to Jdoe's financial information that is located on a financial network because Jdoe requested to transfer money. The transfer conversational agent can also access prior transaction history to make an intelligent guess as to who Jdoe's brother is (Alex Doe) and request confirmation of the brother's name. The transfer conversational agent has the domain knowledge to populate transfer forms and access financial data for both brothers such as KYC/AML data for Jdoe and ADoe. The transfer conversational agent can seamlessly transfer the forms to a human approver for approval of the transfer. A media packager is used to provide entertainment videos while Jdoe waits for approval. The transfer conversational agent queries a confirmation of a transfer fee and then executes the transfer.

Figure 3:
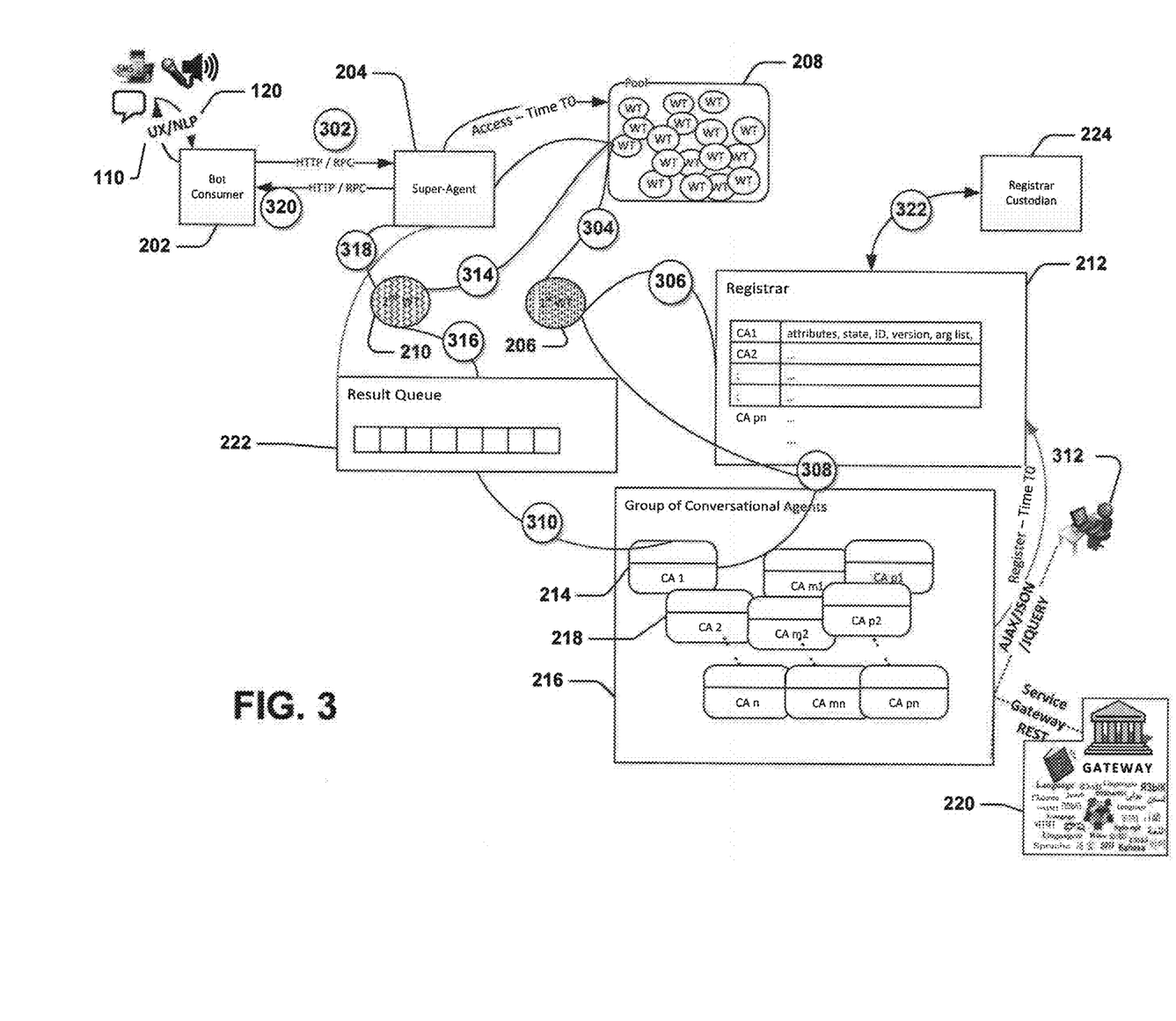
FIG. 3 illustrates an example process flow between the components of the bot framework.

FIG. 3 depicts a process flow between components of the bot framework 200 and the system 100. At 302, the bot consumer 202 provides the super-agent 204 the conversation over a coupling interface. At 304, the super-agent 204 delegates a first worker thread 206 with a reference to the conversation. At 306, the first worker thread 206 uses the conversation to work with the registrar 212 to identify first conversational agents 214 from a group of conversational agents 216. At 308, each conversational agent 214 is provided the conversation over the interface.

At 310, the conversational agent 214 can execute a tree of semantics along with one or more data sets 220 obtained based on a context object in the conversation. The conversational agent 214 returns a result set to the result queue 222. In some embodiments, the conversational agent 214 can use the conversation to prepare a data set and presents the data set to a support user agent 312. The support user agent 312 reviews the dataset to prepare a response and the response from the support user agent 314 is returned to the conversational agent 212 to be put into the result queue 222.

At 314, the super-agent 204 dispatches a subsequent or second worker thread 210 to process the result sets in the result queue 222. At 316, the second worker thread 210 combines one or more of the result sets that relate to the conversation. At 318, the second worker thread 210 returns the combined result set to the super-agent 204. In some embodiments, the second worker thread 210 uses the conversation to work with the registrar 212 to identify subsequent or second conversational agents 218, where each second conversational agent 218 executes the tree of semantic along with one or more data sets 220 that is obtained based on the context object and the second conversational agent 218 returns the result set to the result queue 222.

At 320, the super-agent 204 relays the result set to the bot consumer 202. The bot consumer 202 can provide the results set to the natural language processor 120 and/or user interface 110 to be rendered to the user. At 322, the registrar-custodian 224 can perform CRUD operations on the entries in the registrar 212 to update availability and topic of conversational agents.

Figure 4:
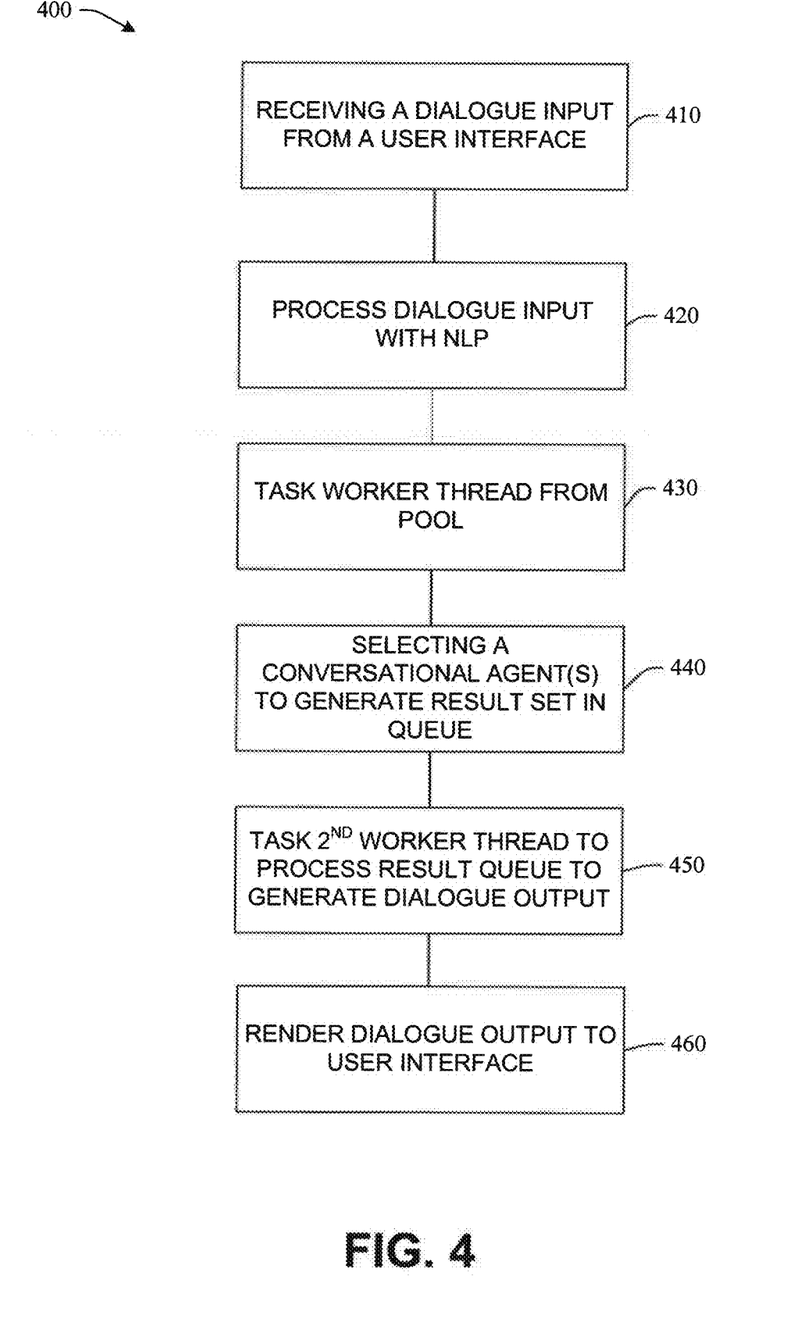
FIG. 4 illustrates a method for supporting a conversation with a user.

With reference to FIG. 4, example method 400 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 are described in conjunction with a specific example is for explanation purposes.

FIG. 4 illustrates a method 400 for domain knowledge conversations with a user. At 410, a dialogue input is received from a user. The dialogue input can be the start of a new conversation or a continuation of an ongoing conversation or a termination of the conversation. At 420, the dialogue input is processed according to natural language processing techniques. The dialogue input can be processed into semantics. Further, an intent can be determined for the dialogue input as well as a context object based on the conversation and data unique to the user.

At 430, a worker thread is selected from a pool of worker threads to be tasked with constructing a dialogue output that is a response to the dialogue input. The worker thread may be an execution unit tasked with developing an output. In some embodiments, multiple worker threads may be tasked with the dialogue input according to amount of semantic parts and/or intents found in the dialogue input.

At 440, one or more conversational agents are selected to generate a results set provided to a results queue. The worker thread can work with a registrar to select a conversational agent from a pool based on the intent, and the semantics. The conversational agent generates the results set by accessing databases and other information sources to compile the results set. The results set are put into the results queue.

At 450, a second worker thread is tasked to process the results queue to generate a dialogue output. The second worker thread compiles the results data from multiple conversational agents into a dialogue output. At 460, the dialogue output is rendered and presented to the user on the user interface.

Figure 5:
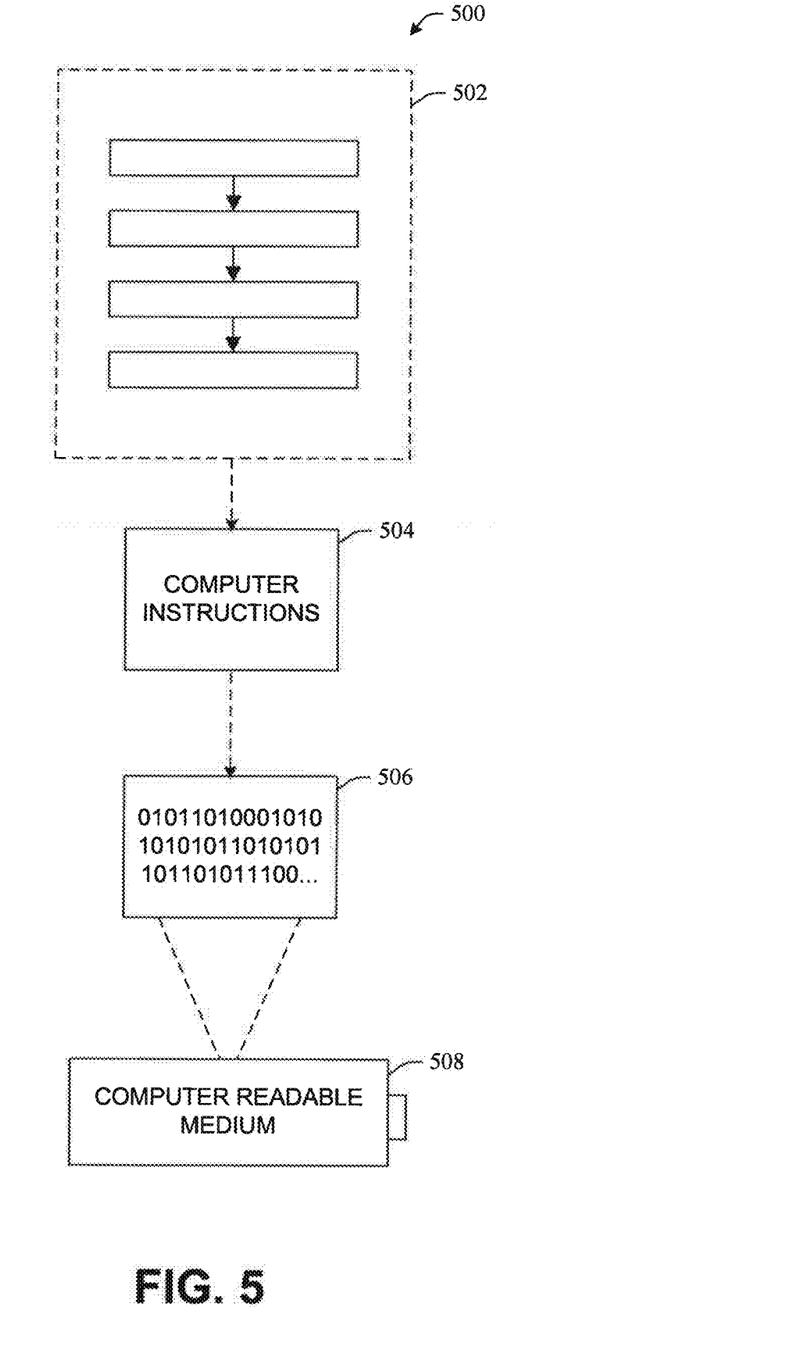
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
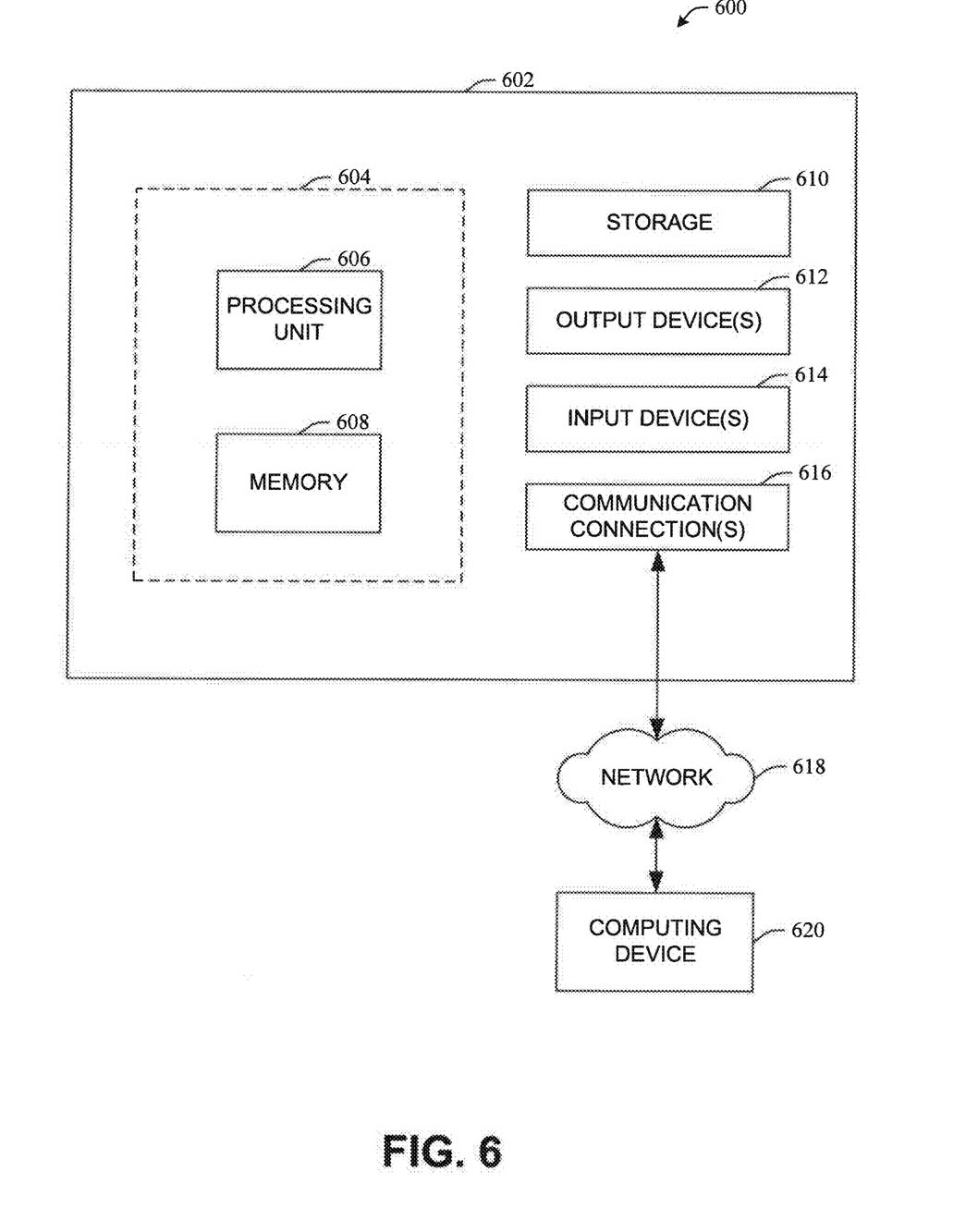
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a bot consumer that receives a first dialogue input from a user, the first dialogue input requesting a response, and wherein the bot consumer determines intent of the first dialogue input;
   a registrar that determines a first conversational agent to respond to the user based on the intent,
   a registrar custodian that adds, updates, and deletes conversational agents at one or more databases in the registrar, wherein the registrar custodian changes a database or table within the registrar that compiles a list reflecting a group of conversational agents;
   a super-agent that selects a worker thread from a pool of worker threads, wherein the worker thread is delegated a task to perform on the first dialogue input;
   wherein the first conversational agent:
      retrieves data to facilitate a response to the first dialogue input,
      renders a response to the user based on the retrieved data,
      predicts and learns user preferences and alternative suggestions to facilitate responses to the user,
   wherein the system is a distributed system and thus allows conversational agents to be added, updated, and removed as domain knowledge changes without taking down the system in its entirety,
   wherein the worker thread works with the registrar to select a greeting conversational agent for the first dialogue output in response to an associated natural language processor showing a greeting, and then transition to an authentication conversational agent which explicitly authenticates the user using a provided picture of his credit card and a requested zip code and social security number associated with the credit card.

2. The system of claim 1, wherein the first conversational agent is configured to:
   execute a semantic tree on the dialogue input to retrieve the data, wherein the data includes one or more result sets; and
   process the one or more result sets to render a response.

3. The system of claim 1, wherein the registrar groups the conversational agents according to attributes of each conversational agent in the group of conversational agents.

4. The system of claim 1, wherein:
   the bot consumer receives a second dialogue input from the user;
   the registrar selects a second conversational agent according to an intent of the second dialogue input; and
   the first conversational agent transfers the second dialogue input to the second conversational agent.

5. The system of claim 4, further comprising:
   a super-agent that determines a second worker thread to process result sets,
   wherein the second worker thread uses the first dialogue input to work with the registrar to determine a second conversational agent based on the intent and the results set.

6. The system of claim 1,
   wherein the first conversational agent determines that a support agent is to provide a decision, and wherein the first conversational agent prepares a data set based on the first dialogue input to provide to the support agent, wherein the data set includes information about the user, and wherein the first conversational agent generates a response for the first dialogue input based on the decision of the support agent.

7. The system of claim 1, further comprising a registrar that:
  learns the first dialogue input and the response to the dialogue input to facilitate future responses and subsequent dialogue inputs, and
  stores the first dialogue input and the response as an associated pair; and an output renderer which determines whether the response is rendered as speech, text, or media.

* * * * *